Figure 1:
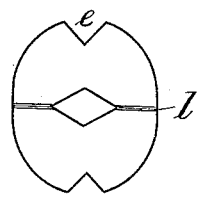

A. J. FREDRIKSON.
MEANS FOR LIGHTING PETROLEUM GAS BURNERS.
APPLICATION FILED DEC. 1, 1913.

1,194,613.  Patented Aug. 15, 1916.

Witnesses:

Inventor:
Andrew John Fredrikson
by
B. Singer
Attorney.

UNITED STATES PATENT OFFICE.

ANDREW JOHN FREDRIKSON, OF JAKOBSDAL, NEAR JÖNKÖPING, SWEDEN.

MEANS FOR LIGHTING PETROLEUM-GAS BURNERS.

1,194,613.

Specification of Letters Patent.

Patented Aug. 15, 1916.

Application filed December 1, 1913. Serial No. 804,098.

*To all whom it may concern:*

Be it known that I, ANDREW JOHN FREDRIKSON, a subject of the King of Sweden, residing at Jakobsdal, near Jönköping, in the Kingdom of Sweden, have invented new and useful Means for Lighting Petroleum-Gas Burners, of which the following is a specification.

My invention refers chiefly to means for lighting petroleum gas burners or for heating small objects without using spirits or liquid fuel. Such burners have been hitherto lighted by burning a quantity of spirits in a receptacle fixed below the burner or by petroleum sucked up by means of an asbestos wick. Another known method consists in using so called spiritoform that is spirits gelatinized with soap or other suitable substance and made into the shape of dice, which also require a receptacle as they become liquid when lighted.

The inconveniences of lighting by means of liquid fuel are: 1, that a receptacle is necessary for the lighting fuel when the latter is burning and that from practical reasons this receptacle is generally placed rather far below the burner; 2, that from this reason the heat is not utilized with the best economy and that consequently a comparatively great quantity of the lighting fuel must be used; 3, that the fluid is often poured incautiously so that it flows over, which not only means a loss but also will easily result in fire or explosion; 4, that when petroleum is used as lighting fluid smoke and smell will often occur. All these inconveniences are avoided by using the new lighting means, which consists of a briquet of suitable shape and of such composition that the same by free admission of air will burn with flame without smoke or smell, and without becoming liquid. In consequence of the fact that the briquet does not become liquid when burning it may be burnt without receptacle and in close proximity to the vaporizing tubes so that a high economic effect is obtained. The shape should preferably be semicircular in order to obtain the best utilization of the heat. A notch of suitable shape in the center of the straight edge or in the curve edge has for its object to leave a space for the vaporizing tube so as to afford a steady position of the briquet on the vaporizing tube and to render the combustion complete.

I can also use a suitable support for the briquet either in or below the burner, the shape or construction of such support being dependent on the shape of the burner.

The briquets may suitably be prepared as follows: With or without the use of heat a mixture is made of finely chopped or ground bog-moss (or peat), genus *Sphagnum*, meal or flour and paraffin or other solid hydrocarbons or similar fuels (for instance ceresin, stearin, fat and spermaceti) and this mixture is pressed into briquets. A suitable composition is: 10 parts paraffin, 20–40 parts corn-flour, 2–4 parts bog-moss. Such briquets may also be made of other ingredients adapted to give a suitable proportion between combustible and non-combustible substances and a suitable speed of combustion for obtaining a fairly smokeless and smell-free combustion of suitable duration. The briquets if made circular may be provided with a score so as to facilitate their division into two semicircular parts. And said circular briquet may further have a central opening of circular or oblong shape or two opposite notches or both the opening and the notches, so that when the briquet is broken into two semicircular pieces, each piece will have a notch either on the straight edge or on the curve edge or on both. These pieces or halves are placed on opposite sides of the burner either in vertical or in horizontal or in oblique position on the lower portion of one of the vaporizing tubes or on another suitable support and then lighted by a match.

On the drawing which shows by way of example some forms of the briquet and its position on the burner, Figures 1, 4, 7, 10, 11 and 12 are plan views of briquets provided with a score 1 so as to be easily broken into two halves. Figs. 3, 6, 9, 13, 14 and 15 show the shape of one-half of each of said briquets or they show briquets which may from beginning have such shape. Figs. 2, 5 and 8 show in dotted lines how these briquets may be placed on the burner.

Figure 2:
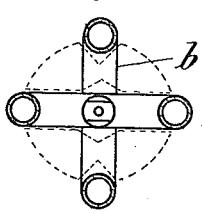
Figure 3:
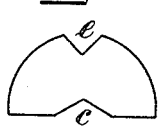
Figure 4:
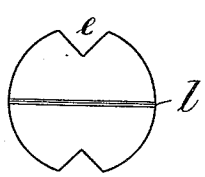
Figure 5:
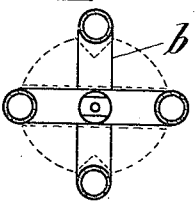
Figure 6:
Figure 7:
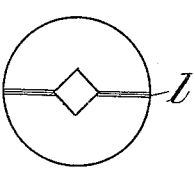
Figure 8:
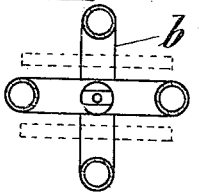
Figure 9:
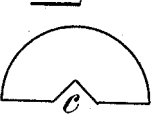
Figure 10:
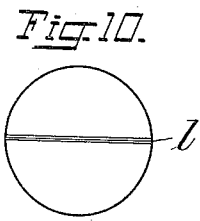
Figure 11:
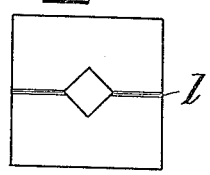
Figure 12:
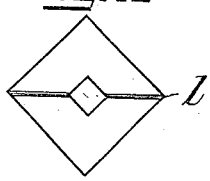
Figure 13:
Figure 14:
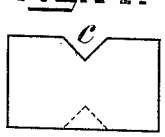
Figure 15:
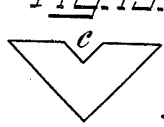

In Figs. 1, 4, 7 and 10 the briquet has a circular or approximately circular circumference. In Figs. 1 and 7 the briquet has formed thereon a central hole, so that there will be a notch in the center of the straight edge of each half when the briquet is divided along the score 1. In Figs. 1 and 4 each of the halves of the briquet has a notch *e* in the curve edge. In Figs. 11 and 12 the briquet is formed square and provided with a hole in the center thereof so as to form a notch $c$ in one edge of each half. In Fig. 14 is indicated by dotted lines that a notch may also be made in the opposite edge of the briquet. In Figs. 2, 5 and 8 briquets of the form shown in Figs. 3 or 6 or 9 are thought to be placed symmetrically on the lower pipe $b$ of the burner (which is shown in horizontal section), in Figs. 2 and 5 in oblique position, in Fig. 8 in vertical position. The notches $c$ and $e$ are adapted to give the briquets a stable position on the burner.

Claims:

1. A fuel briquet of substantially circular shape having formed thereon a diametrically disposed score and having formed therein a centrally disposed hollow space.

2. An inflammable solid fuel which does not become liquid when burning, consisting of a mixture of bog-moss, flour and paraffin and provided with notches on its side, and adapted to embrace a petroleum gas burner for holding the fuel in close proximity thereto.

3. An inflammable solid fuel which does not become liquid when burning, consisting of a mixture of vegetable material of the genus *Sphagnum*, ground cereals, and solid hydrocarbons provided with notches and adapted to embrace a petroleum gas burner and hold the fuel in close proximity thereto.

4. An inflammable solid fuel which does not become liquid when burning, provided with notches on its diametrically opposite sides, adapted to embrace a petroleum gas burner and hold the fuel in close proximity thereto.

In testimony whereof I have signed my name to this specification in the presence of two subscribing witnesses.

ANDREW JOHN FREDRIKSON.

Witnesses:
 JOHN BOSTRÖM,
 STUART TENGRAPH.